US008782682B2

(12) United States Patent
Wilson et al.

(10) Patent No.: US 8,782,682 B2
(45) Date of Patent: Jul. 15, 2014

(54) DETECTING PERIODIC ACTIVITY PATTERNS

(75) Inventors: James Wilson, Dorset (GB); Simon Dyke, Southampton (GB); Trevor Whinmill, Southampton (GB); Ian R. Shelton, Ringwood (GB); Tony Leigh, London (GB); Matt Spencer, Chandlers Ford (GB)

(73) Assignee: Cisco Technology Inc., San Jose, CA (US)

( * ) Notice: Subject to any disclaimer, the term of this patent is extended or adjusted under 35 U.S.C. 154(b) by 158 days.

(21) Appl. No.: 13/391,535

(22) PCT Filed: Jun. 15, 2010

(86) PCT No.: PCT/IB2010/052657
§ 371 (c)(1),
(2), (4) Date: Apr. 9, 2012

(87) PCT Pub. No.: WO2011/027234
PCT Pub. Date: Mar. 10, 2011

(65) Prior Publication Data
US 2012/0246671 A1    Sep. 27, 2012

(30) Foreign Application Priority Data
Sep. 4, 2009   (GB) .................................. 0915364.4

(51) Int. Cl.
*H04H 60/32* (2008.01)
*G06Q 30/02* (2012.01)

(52) U.S. Cl.
CPC ....................................... *G06Q 30/02* (2013.01)
USPC ................... 725/14; 725/13; 725/45; 725/46; 725/47

(58) Field of Classification Search
None
See application file for complete search history.

(56) References Cited

U.S. PATENT DOCUMENTS

| | | | |
|---|---|---|---|
| 6,684,194 B1 * | 1/2004 | Eldering et al. | 705/7.33 |
| 7,260,823 B2 * | 8/2007 | Schlack et al. | 725/9 |
| 2003/0122966 A1 * | 7/2003 | Markman et al. | 348/563 |
| 2008/0212937 A1 * | 9/2008 | Son | 386/83 |

FOREIGN PATENT DOCUMENTS

| | | |
|---|---|---|
| EP | 0 424 648 A2 | 5/1991 |
| WO | WO 97/47135 | 12/1997 |
| WO | WO 00/33233 | 6/2000 |
| WO | WO 2007/024736 A9 | 3/2007 |
| WO | WO 2008/042280 A2 | 4/2008 |

OTHER PUBLICATIONS

Transmittal of the International Search Report and Written Opinion of the International Searching Authority for the captioned application.

(Continued)

*Primary Examiner* — Cai Chen
(74) *Attorney, Agent, or Firm* — Husch Blackwell LLP

(57) ABSTRACT

A method of detecting periodic activity patterns associated with the viewing of audio video content is described. The method includes: recording activity data in an activity log; suppressing the activity log one or more times to suppress non-relevant activity data thereby producing one or more sets of suppressed activity data; passing the one or more sets of suppressed activity data through a signal processing function to convert the one or more sets of suppressed activity data to one or more frequency responses; and analyzing the one or more frequency responses to detect the periodic activity patterns. Related apparatus and methods are also described.

14 Claims, 5 Drawing Sheets

(56) References Cited

OTHER PUBLICATIONS

Dec. 4, 2009 Office Communication in connection with prosecution of GB 0915364.4.
Aug. 17, 2011 Office Communication in connection with prosecution of GB 0915364.4.
Wen Jin et al., "Mining Top-n Local Outliers in Large Databases" *Proceedings of the Seventh ACM SIGKDD International Conference on Knowledge Discovery and Data Mining* (pp. 293-298) (ACM 2001).
William E. Spangler et al., "Using Data Mining to profile TV Viewers" Communications of the ACM (vol. 46, No. 12, pp. 67-72) (Dec. 2003).

* cited by examiner

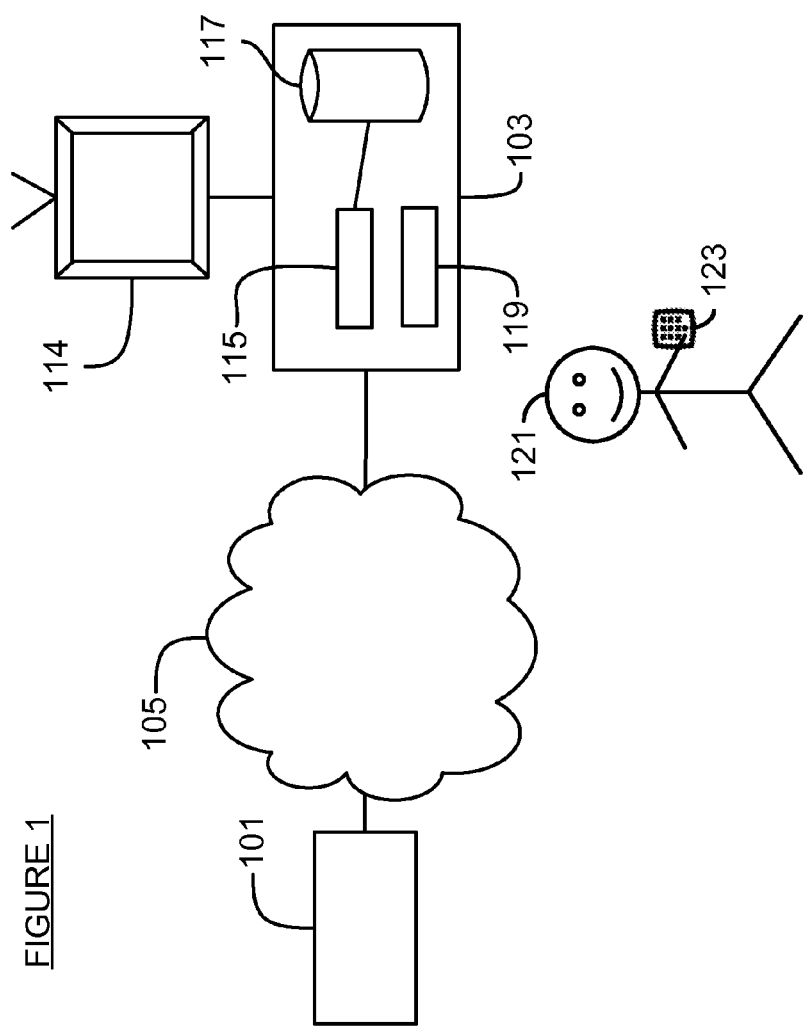

DETECTING PERIODIC ACTIVITY PATTERNS

The present application is a submission under 35 U.S.C. §371 of International Application No. PCT/M2010/052657, filed on 15 Jun. 2010 and published in the English language on 10 Mar. 2011 with publication no. WO 2011/027234 A1; which claims the benefit of the filing date of GB 0915364.4, filed 4 Sep. 2009.

FIELD OF THE INVENTION

The present invention relates to a method of detecting periodic activity patterns associated with the viewing of audio video content.

BACKGROUND OF THE INVENTION

Targeted Substitutional Advertising (TSA) allows broadcasters/television platform operators to serve targeted advertisements to subscribers based on demographic characteristics. Within the context of a Targeted Substitutional Advertising (TSA) system, techniques may be employed to automatically derive demographic profiles of viewers and/or viewing households by monitoring attributes of the content being viewed, such as genre, time, title, channel name etc.

The following documents are believed to represent the state of the art:

Wen Jin, Anthony K. H. Tung, Jiawei Han, "Mining Top-n Local Outliers in Large Databases", Proceedings of the Seventh ACM SIGKDD International Conference on Knowledge Discovery and Data Mining, pages 293-298, Aug. 26-29, 2001, San Francisco, Calif.;

William E. Spangler, Mordechai Gal-Or, Jerrold H. May, "Using Data Mining to Profile TV Viewers", Communications of the ACM, volume 46 number 12, pages 66-72, December 2003;

PCT Published Patent Application WO 00/33233 of Telecom Partners Limited;

PCT Published Patent Application WO 2007/024736 of Biap Systems Inc.;

PCT Published Patent Application WO 2008/042280 of United Video Properties Inc.;

European Published Patent Application EP 0 424 648 of General Instrument Corporation; and U.S. Pat. No. 7,260,823 to Schlack et al.

SUMMARY OF THE INVENTION

Consider as an example a household that watches significant amounts of programming with genres such as "motoring", "news" and "gardening". Profiles could be derived from these viewing habits, e.g. "adult, female, gardening interests" and "adult, male, motoring interests". Over a long period of time, this profile set can be considered to be the dominant set for the household. The system would typically allow for other viewing to occur but not affect the dominant set, e.g. watching a sports event such as horse racing would not add a "sports interests" profile. For this reason, only relatively large amounts of viewing (when compared to total viewing) are considered when deriving profiles. If a young child visited the household regularly, e.g. every weekend for a few hours, and watched an hour of "childrens" genre programming, this viewing would be considered too small to add a "young child" profile to the dominant set. However, the fact that a young child regularly visits the household may be of interest to an advertiser who could target appropriate advertising, e.g. toys or family holidays, to the household.

There is provided in accordance with an embodiment of the present invention a method of detecting periodic activity patterns associated with the viewing of audio video content, the method including: recording activity data in an activity log; suppressing the activity log one or more times to suppress non-relevant activity data thereby producing one or more sets of suppressed activity data; passing the one or more sets of suppressed activity data through a signal processing function to convert the one or more sets of suppressed activity data to one or more frequency responses; and analysing the one or more frequency responses to detect the periodic activity patterns.

Further, in accordance with an embodiment of the present invention, the activity data includes time spent by a household on a periodic basis performing an activity having a defined attribute.

Still further, in accordance with an embodiment of the present invention, the activity log includes an array, wherein each element in the array includes an activity period, wherein each value of each element includes the time.

Additionally, in accordance with an embodiment of the present invention, the activity log is updated when a change occurs in the defined attribute.

Moreover, in accordance with an embodiment of the present invention, the defined attribute includes one or more of the following: content genre; channel operator; viewing source/origin; content type; viewing speed; and language.

Further, in accordance with an embodiment of the present invention, the change occurs due to any one of the following group of triggers: an initial channel is selected; a new channel is selected; playback of previously recorded audio video content is commenced; a request is received for non-broadcast audio video content; a change in viewing speed of the audio video content is detected; and new audio video content commences or is selected.

Still further, in accordance with an embodiment of the present invention, the defined attribute is defined by and received from a broadcaster/television platform operator.

Additionally, in accordance with an embodiment of the present invention, the signal processing function comprises a Discrete Fourier Transform, or a Discrete Cosine Transform, or a Discrete Hartley Transform, or a Wavelet Transform.

Moreover, in accordance with an embodiment of the present invention, the periodic viewing patterns are used to schedule a targeted advertisement, or to schedule a targeted promotion of future audio video content, or to generate a favourite channel list, or to sort available channels in an electronic programme guide in order of popularity.

Further, in accordance with an embodiment of the present invention, the periodic activity patterns includes periodic viewing patterns; the activity data includes viewing data; the activity log includes a viewing log; the suppressing the activity log includes: suppressing the viewing log to suppress viewing data from a first time period thereby producing a first set of suppressed viewing data, and suppressing the viewing log to suppress viewing data from a second time period thereby producing a second set of suppressed viewing data; the passing the one or more sets of suppressed activity data includes passing the first set and the second set of suppressed viewing data through a signal processing function to convert the first set and the second set of suppressed viewing data to first and second frequency responses; and the analysing the one or more frequency responses includes analysing the first and second frequency responses to detect the periodic viewing patterns.

Still further, in accordance with an embodiment of the present invention, the periodic viewing pattern includes a weekly viewing pattern occurring on weekend days, and the first time period includes weekdays, and the second time period includes weekend days, and the analysing includes identifying a maximum amplitude in the first frequency response at a frequency of 1 Hz thereby indicating the weekly viewing pattern occurring on weekend days.

There is further provided in accordance with an embodiment of the present invention, a client device for viewing audio video content, the client device including: recording means for recording activity data in an activity log, the activity data relating to activities associated with viewing of the audio video content; storage means for storing the activity log; and processing means for: suppressing the activity log one or more times to suppress non-relevant activity data thereby producing one or more sets of suppressed activity data; passing the one or more sets of suppressed activity data through a signal processing function to convert the one or more sets of suppressed activity data to one or more frequency responses; and analysing the one or more frequency responses to detect the periodic activity patterns.

BRIEF DESCRIPTION OF THE DRAWINGS

The present invention will be understood and appreciated more fully from the following detailed description, taken in conjunction with the drawings in which:

FIG. 1 is a simplified pictorial illustration of system constructed and operative in accordance with embodiments of the present invention;

FIG. 2 is a simplified illustration of an activity log according to embodiments of the present invention;

DETAILED DESCRIPTION OF AN EMBODIMENT

Figure 3:
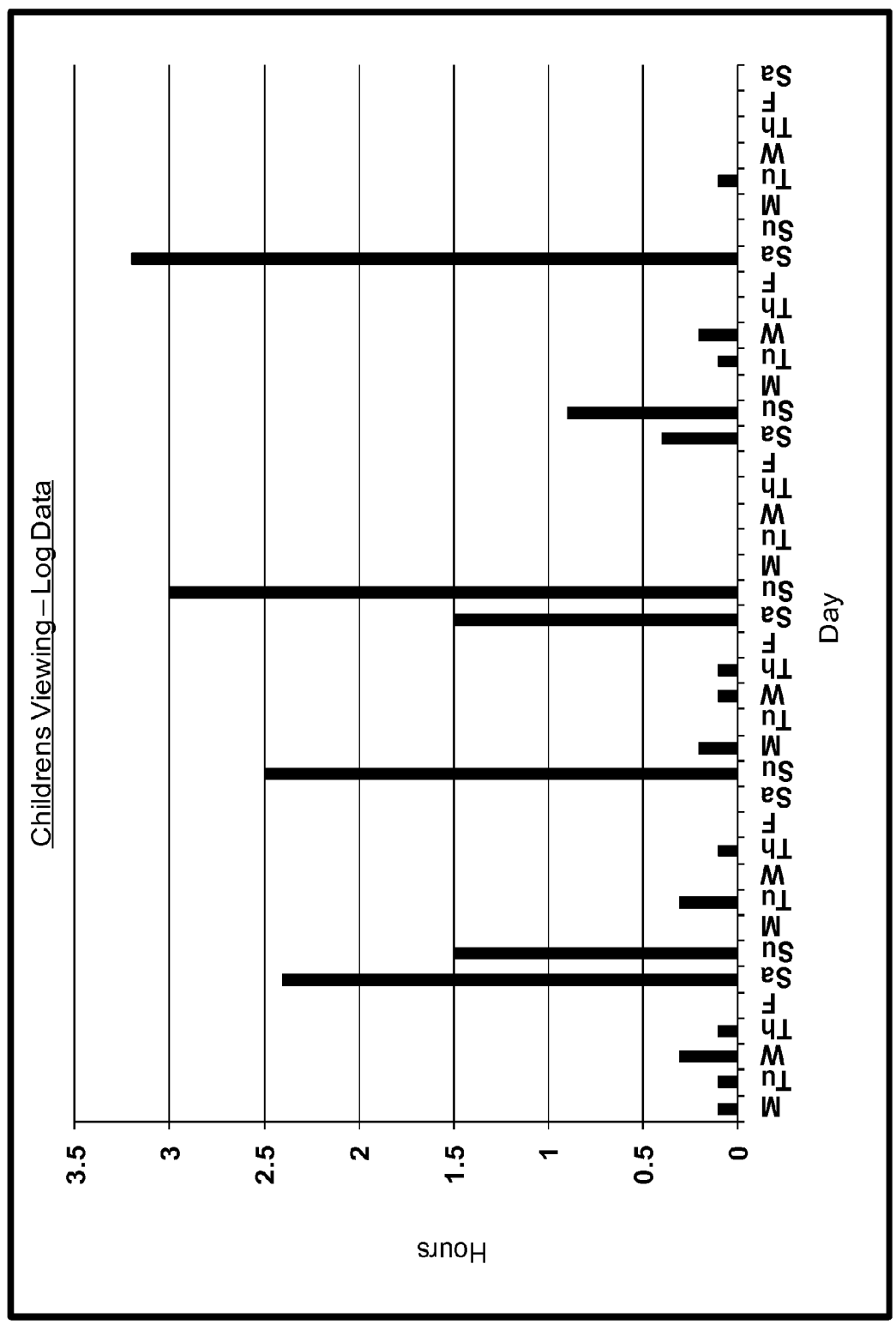
FIG. 3 is a simplified illustration of a activity log when viewed as a two dimensional chart according to embodiments of the present invention.

Reference is now made to FIG. 1, which shows a headend 101 that communicates with a display device 103 via a one-way or two-way communication network 105 that includes at least one of the following: a satellite based communication network; a cable based communication network; a terrestrial broadcast television network; a telephony based communication network; a mobile telephony based communication network; an Internet Protocol (IP) television broadcast network; and a computer based communication network.

It is appreciated that in alternative embodiments, communication network 105 may, for example, be implemented by a one-way or two-way hybrid communication network, such as a combination cable-telephone network, a combination satellite-telephone network, a combination satellite-computer network, or by any other appropriate network.

Physical links in network 105 are implemented via optical links, conventional telephone links, radio frequency (RF) wired or wireless links, or any other suitable links.

It is appreciated that headend 101 may communicate with a plurality of display devices 103 via communication network 105. Additionally, or alternatively, a plurality of headends 101 may communicate with a single display device 103 or with a plurality of display devices 103 via communication network 105. For simplicity of depiction and description, and without limiting the generality of the present invention, only one display device 103 and a single headend 101 are illustrated in FIG. 1 and referred to below as communicating via communication network 105.

The transmissions (typically at least one of the following: television programming including pay and/or non-pay television programming) are typically carried in a Moving Pictures Expert Group (MPEG) transport stream.

MPEG is an industry standard developed by the "Moving Pictures Expert Group" working group of the International Standards Organization (ISO) for video and audio source coding using compression and multiplexing techniques to minimize video signal bit-rate in preparation for broadcasting.

The multiplexed data are transmitted to display device 103 via network 105 and received at an integrated receiver decoder (IRD) 115 in display device 103.

The IRD 115 is operable to receive, demultiplex, decode and decrypt/descramble as necessary the multiplexed data transmissions. IRD 115 may operate under control of a conditional access device such as a removable security element (not shown) as is well known in the art. The removable security element may, for example, include a smart card (not shown) as is well known in the art.

Operatively associated with IRD 115 within display device 103 is a storage device 117, such as a memory or disk (e.g. NVRAM, Flash memory, hard-disk etc.). Storage device 117 could be remote from display device 103 or comprised within display device 103.

Display device 103 also includes a processor 119, which typically includes operating system software that enables processing of the program transmissions.

Display device 103 typically also includes, or is associated with, a digital video recorder (DVR). The DVR is typically operatively associated with IRD 115 and processor 119.

IRD 115 typically includes at least one audio decoder (not shown) and at least one video decoder (not shown). The DVR also preferably includes at least one audio decoder (not shown) and at least one video decoder (not shown). Alternatively, the DVR uses an audio decoder and a video decoder comprised in the IRD 115, in which case IRD 115 includes more than one audio decoder and more than one video decoder.

The DVR can record at least some of the transmissions received at the IRD 115 in the storage device 117 and display recorded transmissions on display 114 at discretion of a user and at times selected by the user. It is appreciated that the recorded transmissions displayed by the DVR typically comprises transmissions delayed with respect to a time of broadcast of the transmissions by headend 101. Therefore, transmissions that undergo decoding, and if necessary decryption/descrambling at IRD 115, arrive either from broadcast transmissions broadcast by the headend 101, or from storage device 117 of the DVR. The transmissions may, for example, be broadcast by headend 101 as regular scheduled transmissions or in the form of video-on-demand (VOD), near-video-on-demand (NVOD) or push-video-on-demand transmissions.

The DVR optionally also stores advertisements for use in advertisement substitution received at the IRD 115 in storage device 117.

It is appreciated that the elements of headend 101 and display device 103 may be implemented in any appropriate combination of hardware and/or software. At least some of the elements comprising display device 103 may be comprised in a single integrated circuit (IC).

Display device 103 is typically operated by a user 121, for example via a remote control (RC) 123. Using RC 123, a user 121 can select a programme to view. The operating system software within display device 103 monitors user interaction with display device 103 and maintains a database of channel and event information. The information available for events is typically specific to a particular broadcaster, but typically includes details such as event title; event start time; event duration; channel; parental rating; and event genre. The database is typically constructed from information supplied by the broadcaster and typically broadcast alongside the regular video & audio content (e.g. Service Information (SI), as described in "*ETSI EN* 300 468; *Digital Video Broadcasting (DVB); Specification for Service Information (SI) in DVB systems*".)

The operating system software enables the user to choose an event/channel to view. Since the software maintains the channel and event database, it has detailed knowledge of attributes of the event (including genre, start time, duration etc.) and the channel currently being viewed.

According to embodiments of the present invention, two extensions are made to the existing operating system software:

1. A logging component; and
2. A log analysis component

The combination of these two extensions enables an operator/broadcaster to execute queries within display device 103 in order to spot viewing or behavioural patterns. The results of the queries may be used for any purpose, but examples include targeted advertising; targeted promotions; automatic generation of favourite channels list; sorting available channels displayed by the Electronic Programme Guide (EPG) in order of viewing popularity etc. All data generated and stored by these two extensions, and the results of the executed queries are typically stored within display device 103.

The logging component will now be described in more detail.

The logging component dynamically constructs an activity log that records attributes of viewing and viewer behaviour on a periodic basis, e.g. daily, weekly, etc. The activity log typically comprises a time series of values against a set of one or more attributes. Any combination of one or more attributes may be logged, for example:

Content genre (e.g. motoring, sports, children's, music, etc.);
Channel operator (some operators provide multiple, similar channels on a platform, e.g. Discovery, MTV);
Viewing source/origin (e.g. live, VOD, time-shifted, streamed, downloaded, non-broadcast, PVR playback, etc.);
Content type (e.g. primary content, advertising content, promotional content, interactive applications, games, photos, with/without subtitles/closed captions, etc.);
Viewing speed (e.g. normal, trick mode (fast forward, fast backward (rewind)), etc.);
Language (English, French, Hindi, etc.)

Other attributes that may be logged will be apparent to someone skilled in the art.

The log is stored within storage device 117 and is typically organised as a set of arrays where each array represents the attribute being recorded (e.g. a particular genre).

In the embodiments where display device 103 comprises a DVR, the content attributes are also stored with the content such that the attributes can be examined and logged on subsequent playback of the content.

The set of attributes being logged, the periodicity of the logging and the start time of a period may be defined in a number of ways, e.g. set by the broadcaster/platform operator using special signalling (e.g. an over-the-air message); or set as a fixed feature of the operating system software.

The logs are typically updated whenever a change in attribute occurs, which will typically be due to one of the following:

An initial channel is selected after power-on of display device 103 or exiting a standby mode;
A new channel is selected by user 121;
User 121 starts playback of a previously recorded event using the DVR;
An attribute (e.g. content genre, content type) changes whilst watching a channel, (e.g. genre changes from "childrens" to "motoring", type changes from "primary" content to "advertising" content);
A request is received from user 121 for a non-broadcast content item;
User 121 changes the viewing speed (e.g. by using a trick-mode).

The operating system software maintains the logs according to the specified period. At the start of a new activity period, an empty activity record is typically appended to the log for each of the attributes being recorded. The software may update the activity records directly, or alternatively may maintain per-attribute temporary counters that are updated during the activity period. At the end of the activity period the total activity time is stored in the log.

Since the logs represent many periods of activity and could monitor many attributes, compression may be used to reduce the storage requirements. So long as the unmodified (i.e. uncompressed) log is available for querying at a later time, any suitable compression algorithm may be used. Examples of suitable compression algorithms include Run Length Encoding (RLE) and Lempel-Ziv-Welch (LZW).

The log for a particular attribute typically comprises a simple array, where each element represents a activity period and the value comprises the time spent performing an activity having the defined attribute in the defined activity period. FIG. 2 shows an example of the information contained in the activity logs. Each row represents an activity period and each column represents the attribute being logged. Time is expressed in a format understood by the software (e.g. seconds, minutes, hours, etc.) In the example shown in FIG. 2, individual cells represent the number of hours per day spent viewing one of three different genres ("childrens", "sport" and "motoring").

Logs may also be visualised as a two dimensional chart, as shown in FIG. 3, where the horizontal axis represents the activity period of the log and the vertical axis represents time spent performing an activity in that activity period. In the example shown in FIG. 3, approximately forty days viewing of "childrens" genre content is shown, with a strong preference for weekend (i.e. Saturday and Sunday) viewing. There is other occasional viewing of "childrens" genre content during the week, such as might happen during channel surfing, for example.

The log analysis component will now be described in more detail.

Log analysis involves processing of the logs in order to satisfy queries. Examples of types of query are given, however these are not intended to be exhaustive. Any suitable textual or binary syntax may be chosen for the queries. The log analysis component may be performed by processor 119 or by another means for processing.

The core of the log analysis phase is to apply signal processing techniques to the log data in order to convert time domain data to frequency domain data. The examples presented below use Fourier analysis, with the particular analysis function being the Discrete Fourier Transform (DFT). Other Fourier analysis functions that that could be used include the Discrete Cosine Transform (DCT) and Discrete Hartley Transform (DHT). Other suitable signal processing techniques will be apparent to someone skilled in the art and include Wavelet Transforms.

Figure 4:
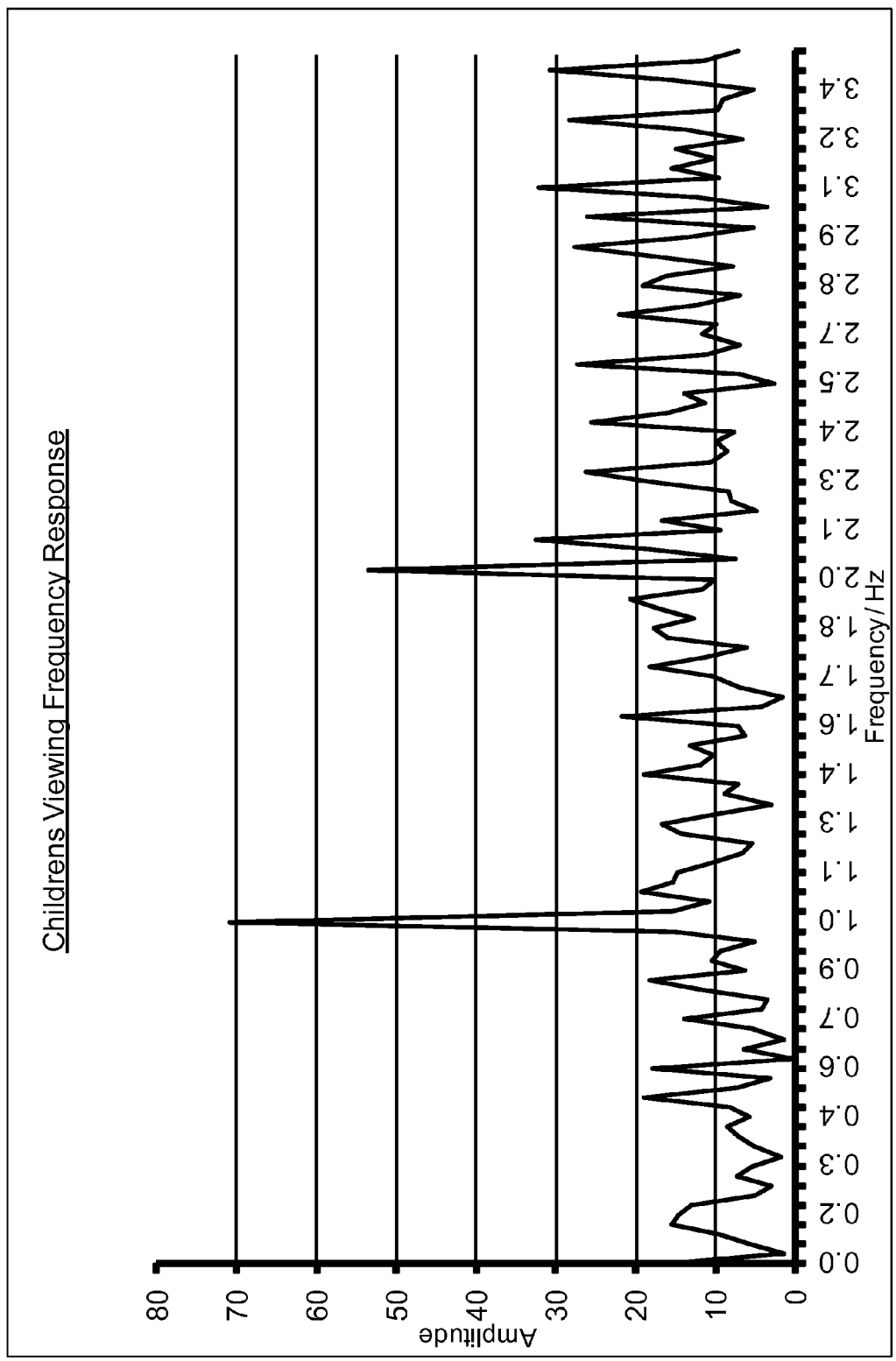
FIG. 4 is a simplified illustration of a frequency response according to embodiments of the present invention.

When log data similar to that shown in FIG. 3 is extended (e.g. to 250 days) and then processed with a Fourier transform, a frequency response like that shown in FIG. 4 is produced.

In the frequency response of FIG. 4, the horizontal axis represents the frequency, in Hz, and the vertical axis represents the amplitude of the frequency response. A suitable analysis period is chosen such that the frequency response relates to the source data. In the present example, an analysis period of seven is chosen since there are seven days per week and each period in the log is one day. The frequency response of FIG. 4 shows the strongest response at 1 Hz indicating that there is regular viewing happening every 7 days.

The techniques described above are tolerant of typical household behaviour, e.g. vacations where no viewing occurs, more viewing around national holidays, etc. This is because even though there may be breaks in the log data, the conversion of the data to the frequency domain means that regular patterns in the log can still be detected in sections of the log that are complete. The frequency response is cumulative, i.e. the more times regular activity is detected in the log, the stronger the frequency response.

The frequency response of FIG. 4 does not show on which days the regular viewing is occurring—it shows just that regular viewing occurs every 7 days. In order to discover on which days the regular viewing occurs, selective suppression of the input data is carried out. Selective suppression accentuates parts of an activity log that are of interest (i.e. that are relevant to a particular query) by suppressing parts of the activity log that are not of interest (i.e. that are not relevant to the query). Selective suppression acts as a gating mechanism, i.e. if the gate is open the sample data is left unmodified but if the gate is closed a 0 is substituted for the original sample data.

For example, the following table shows a two-week subset of an activity log, where the first record ("Day 1") is the first weekday. The first row in the table shows the original log data whilst the second row in the table shows the data after suppression of weekday viewing (i.e. Day 1 through Day 5):

| Day 1 | Day 2 | Day 3 | Day 4 | Day 5 | Day 6 | Day 7 | Day 8 | Day 9 | Day 10 | Day 11 | Day 12 | Day 13 | Day 14 |
|---|---|---|---|---|---|---|---|---|---|---|---|---|---|
| 0 | 0.1 | 0.3 | 0.1 | 0 | 3 | 1.1 | 0 | 0.02 | 0.2 | 0.2 | 0.1 | 1 | 1.4 |
| 0 | 0 | 0 | 0 | 0 | 3 | 1.1 | 0 | 0 | 0 | 0 | 0 | 1 | 1.4 |

Figure 5:
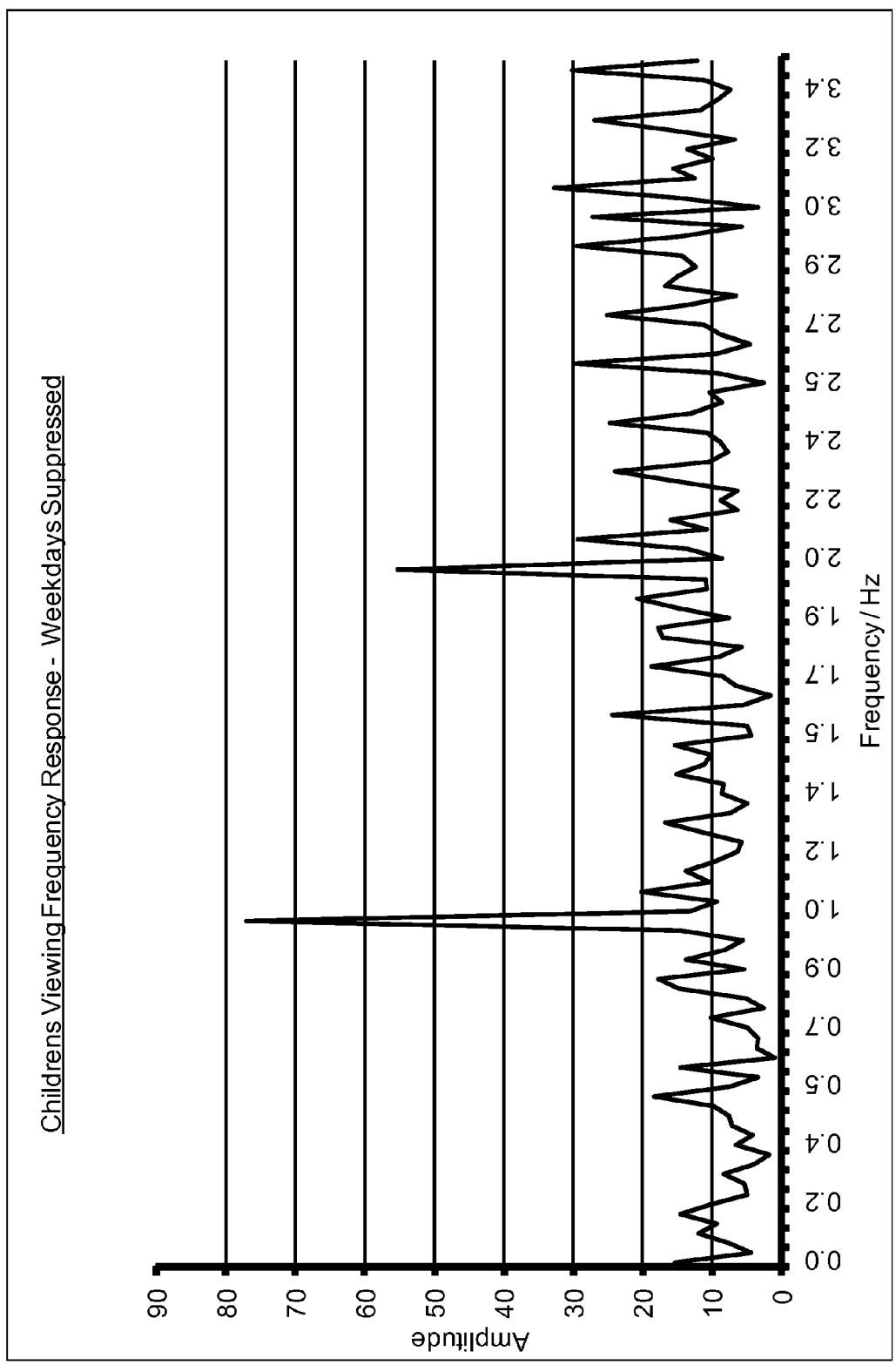
FIG. 5 is a simplified illustration of a frequency response according to embodiments of the present invention.
Figure 6:
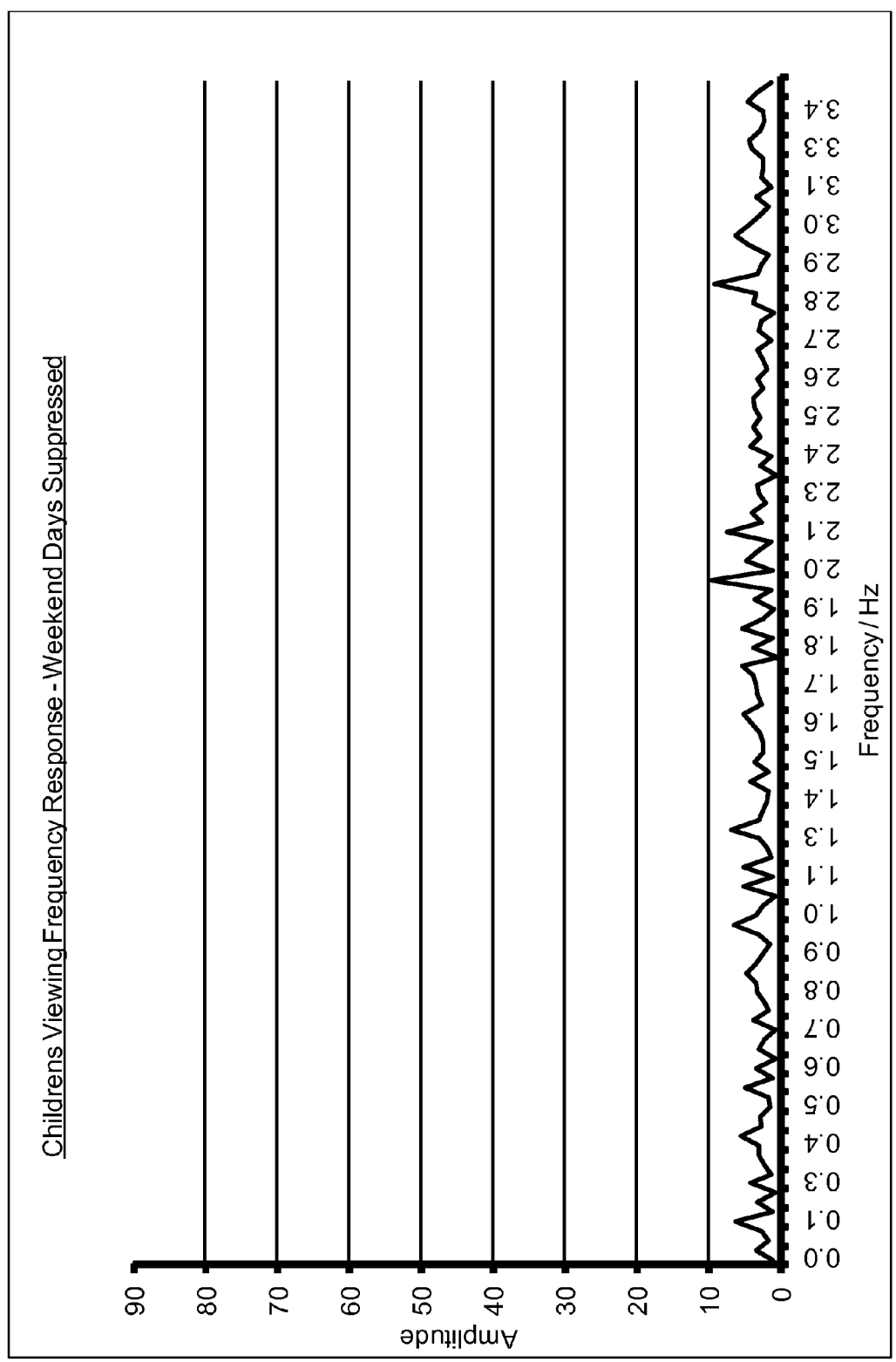
FIG. 6 is a simplified illustration of a frequency response according to embodiments of the present invention.

Referring once again to the example of FIGS. 3 and 4, if the query is attempting to determine whether regular viewing occurs at weekends or on weekdays, two executions of the Fourier analysis are carried out, firstly with the log entries for weekend days suppressed; and secondly with the log entries for weekdays suppressed. FIGS. 5 and 6 show the results of Fourier analysis for these two suppression cases. FIG. 5 shows the results of Fourier analysis with weekday data suppressed, whilst FIG. 6 shows the results of Fourier analysis with weekend data suppressed.

A post signal processing step is typically utilised after the Fourier analysis stage (e.g. to determine the frequency having the highest amplitude using a simple linear search through the output data to determine the highest value). In the above described example, a search for the maximum amplitude of the Fourier analysis of FIG. 6 reveals an amplitude of 10 occurring at a frequency of 2 Hz. A search for the maximum amplitude of the Fourier analysis of FIG. 5 reveals an amplitude of 77 occurring at a frequency of 1 Hz. The maximum amplitude of 77 occurs when the weekday activity log data is suppressed. Thus, by comparing the two Fourier analysis results, it can be detected that there is a strong weekly viewing pattern occurring on weekend days.

The log analysis steps support the execution of arbitrary queries. Query expressions can be constructed by the operator/broadcaster and delivered to the display device population using any suitable signalling mechanism.

In the above described example, the query can determine that weekend viewing of "childrens" genre content is significant when compared to weekday viewing. The reasons for this may be many. However, the results do have value, and could be used for example:

To help an advertiser with targeted advertising (e.g. so that more advertisements targeted at children or adults with children are shown at weekends). Furthermore, a household with children can generally be expected to have regular weekday viewing of "childrens" genre content in addition to weekend viewing. Therefore a household that only shows regular weekend viewing of "childrens" genre content (as in the above described example) seems to deviate from the norm. Targeted advertising may therefore target adults during the week but adults and children at weekends. Given the relatively small amount of "childrens" genre content viewing in the above example, a typical targeted advertising system that just totalled up total viewing times by genre may not have considered the "childrens" genre content viewing to be significant;

To implement a query to reorganise the Electronic Programme Guide (EPG) at weekends, such that "childrens" genre programming has a higher presence;

To assist a broadcaster with targeted promotions of "childrens" genre content (e.g. a new cartoon series) at particular times (e.g. weekends).

Any combination of Fourier transforms and input log data suppressions may be executed by a query expression. Although the above described example comprises two Fourier analysis steps operating on a single log ("childrens" genre activity log), any number of genre logs may be used within a single query.

In the example described above, hours per day per genre were recorded in the activity log. However, finer grained data such as minutes viewed per hour per genre could also be logged and used to detect semi regular viewing during the day, such as evening or early morning viewing during weekdays. For example, a log is constructed that stores channel number against viewing time, where the time periods are "day parts", e.g. morning, mid-day, afternoon, evening, late evening, night. A query is then constructed to detect a higher frequency of channel changing during week-day evenings. Weekend viewing is not considered. Two analysis steps are used. Firstly, all non-evening weekday periods and all weekend periods are suppressed and the first analysis step is performed. Secondly, all weekday evening periods and all weekend viewing periods are suppressed and the second analysis step is performed. If a higher frequency of evening only weekday viewing is detected it could indicate a working household, for example. This information could be used by a channel operator to suggest to a user the recording of content that would not ordinarily be viewed (e.g. day time re-runs of a favourite series that could be recorded). It could also be used by an advertiser to target premium advertising to the user on weekday evenings in the knowledge that there is a strong likelihood that the viewer is engaged.

In another example, a TV operator would like to organise the EPG so that frequently viewed channels have more presence within the EPG. This could take the form of re-organising the list of channels in the EPG, or automatically adding channels to a favourite channels list, for example. A log is constructed that stores channel viewed against viewing time, where the time periods are days. A query is constructed to detect the top ten most frequently viewed channels. The query considers each of the channels in turn, with no suppression used since all viewing of the channel is deemed to be significant. Following the analysis step, the query can determine the top ten most frequently viewed channels by simple sorting of the analysis data.

In another example, a TV operator runs a campaign to raise awareness of interactive applications/services and sets the log to record whenever an interactive application is used. After some defined time has elapsed, the log is processed on a week by week basis, with the frequency of interactive application usage being analysed by the time-domain to frequency-domain signal processing function. In this case, no suppression of the log data is performed and the amplitude of the strongest frequency response is not relevant. The TV operator creates a query that looks for an increase in frequency of interactive application usage in the weeks since the campaign ran in order to determine if the campaign was successful in this household, i.e. if there has been an increase in frequency. Similar techniques could be used to detect an increase in the frequency of viewing of a particular content genre, e.g. Sports.

The log analysis system may also be used to detect other viewer behaviours. Examples of other timed actions are:

Time spent fast forward viewing of advertisements/commercials in pre-recorded content;

Time spent navigating the EPG, as a percentage of total viewing time.

The combination of these timed actions and the log analysis component can provide an operator/broadcaster with an insight into a particular household's viewing behaviour.

In alternative embodiments, the Fourier analysis may also be applied to a subset of the log data such that patterns occurring within a given time-frame could be found, e.g. within the last week or month or two months ago.

The Fourier analysis may also be used in conjunction with other analysis techniques. For example, a baseline activity figure may be used when evaluating the results of the Fourier analysis in order to determine if the results are significant. This activity baseline could be calculated by averaging the total activity time over the time-frame of the activity log being considered in order to obtain a daily average activity figure.

The available query expressions are typically executed by the operating system software at pre-defined times typically defined by the broadcaster/operator. They could, for example, be executed on a periodic basis or the query expression could specify a time at which it should be executed, thereby minimising the processing that is carried out.

The result of a query expression is typically specific to the application making use of the analysis results, and examples could include a Boolean (true/false), a confidence level expressed as a numeric value or a channel name.

Although the above described examples have related to the processing of activity logs within display device 103, data from multiple activity logs (e.g. from multiple viewers) could also be processed by a broadcaster/operator. For example, in a broadcast system, a statistically valid population that frequently reports viewing information to the broadcaster is chosen from the entire viewing population. This reported viewing information may already be in the form of an activity log, or could be processed to create an activity log. The analysis methods described above may be used in conjunction with these activity logs to:

1. Validate the query expressions, i.e. if a query expression produces expected results on the statistically valid population then it can be expected to be valid across the entire population;

2. Assist the broadcaster/operator in creating and editing query expressions, in that the query can be executed on historic activity logs in order to test validity before being broadcast to the viewer population;

3. Create queries that operate across activity logs from many viewers, allowing detection of activity patterns within the whole population.

The techniques described above are typically resilient to noisy input data and to large gaps of viewing due to the nature of the signalling processing techniques that convert the activity logs into a frequency analysis (e.g. peaks that look significant in the time domain may not produce a response in the frequency domain).

The techniques described above can be used to detect viewing patterns that would otherwise be hard to detect from the raw activity data. Examples include:

1. Viewing of daytime TV on certain days of the week, e.g. Tuesday and Friday, which could indicate that the viewer only works on a part-time basis;

2. Significantly different genres viewed on a weekend evening compared to weekday evenings, which could indicate a family member works away from home during the week;

3. "Childrens" genre viewing occurring for short periods (e.g. less than 30 minutes) most days, which could indicate children in the house but with television viewing being tightly controlled by a parent. Without the techniques described above, such a viewing pattern might be considered as noise in the overall viewing patterns of the household.

The activity logs are typically maintained within the display device 103 and the processing of the activity logs typically also occurs within display device 103.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product; on a tangible medium; or as a signal interpretable by an appropriate computer.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

The invention claimed is:

1. A method of detecting periodic activity patterns associated with the viewing of audio video content, said method comprising: performing the following steps in a specially programmed physical device:
   recording activity data in an activity log;
   suppressing said activity log to suppress non-relevant activity data thereby producing a plurality of sets of suppressed activity data;
   passing each of said sets of suppressed activity data through a signal processing function to convert each of said sets of suppressed activity data to a plurality of respective frequency responses; and
   comparing one of said frequency responses with another of said frequency responses to detect said periodic activity patterns.

2. The method of claim 1, wherein said activity data comprises time spent by a household on a periodic basis performing an activity having a defined attribute.

3. The method of claim 2, wherein said activity log comprises an array, wherein each element in said array comprises an activity period, wherein each value of each element comprises said time.

4. The method of claim 3, wherein said activity log is updated when a change occurs in said defined attribute.

5. The method of claim 4, wherein said defined attribute comprises one or more of the following: content genre; channel operator; viewing source/origin; content type; viewing speed; and language.

6. The method of claim 5, wherein said change occurs due to any one of the following group of triggers: an initial channel is selected; a new channel is selected; playback of previously recorded audio video content is commenced; a request is received for non-broadcast audio video content; a change in viewing speed of said audio video content is detected; and new audio video content commences or is selected.

7. The method of claim 2, wherein said defined attribute is defined by and received from a broadcaster/television platform operator.

8. The method of claim 1, wherein said signal processing function comprises a Discrete Fourier Transform, or a Discrete Cosine Transform, or a Discrete Hartley Transform, or a Wavelet Transform.

9. The method of claim 1, wherein said periodic viewing patterns are used to schedule a targeted advertisement, or to schedule a targeted promotion of future audio video content, or to generate a favourite channel list, or to sort available channels in an electronic programme guide in order of popularity.

10. The method of claim 1, wherein said periodic activity patterns comprise periodic viewing patterns; said activity data comprises viewing data; said activity log comprises a viewing log; said suppressing said activity log comprises: suppressing said viewing log to suppress viewing data from a first time period thereby producing a first set of suppressed viewing data, and suppressing said viewing log to suppress viewing data from a second time period thereby producing a second set of suppressed viewing data; said passing said sets of suppressed activity data comprises passing said first set and said second set of suppressed viewing data through a signal processing function to convert said first set and said second set of suppressed viewing data to first and second frequency responses; and said comparing comprises comparing said first and second frequency responses to detect said periodic viewing patterns.

11. The method of claim 10, wherein said periodic viewing pattern comprises a weekly viewing pattern occurring on weekend days, and said first time period comprises weekdays, and said second time period comprises weekend days, and said comparing comprises identifying a maximum amplitude in said first frequency response at a frequency of 1 Hz thereby indicating said weekly viewing pattern occurring on weekend days.

12. A client device for viewing audio video content, said client device comprising:
   recording means for recording activity data in an activity log, said activity data relating to activities associated with viewing of said audio video content;
   storage means for storing said activity log; and
   processing means for:
      suppressing said activity log times to suppress non-relevant activity data thereby producing a plurality of sets of suppressed activity data;
      passing each of said sets of suppressed activity data through a signal processing function to convert each of said sets of suppressed activity data to a plurality of respective frequency responses; and
      comparing one of said frequency responses with another of said frequency responses to detect said periodic activity patterns.

13. A method of detecting periodic activity patterns associated with the viewing of audio video content, said method comprising: performing the following steps in a specially programmed physical device:
   recording activity data in an activity log;
   suppressing said activity log one or more times to suppress non-relevant activity data thereby producing one or more sets of suppressed activity data;
   passing said one or more sets of suppressed activity data through a signal processing function to convert said one or more sets of suppressed activity data to one or more frequency responses; and
   analyzing values of said one or more frequency responses to detect said periodic activity patterns;
   wherein said analyzing further comprises analyzing values of said one or more frequency responses to detect a behavioural pattern of viewers viewing said audio video content; and
   wherein said behavioural pattern comprises time spent fast-forward viewing of advertisements in pre-recorded audio video content; or time spent navigating an electronic program guide as a percentage of total viewing time.

14. The method of claim 1, wherein the step of passing each of the sets of suppressed activity data through the signal processing function comprises passing a subset of each of the sets of suppressed activity data through the signal processing function.

* * * * *